April 29, 1969
L. W. MARKS
3,441,885
HIGH VOLTAGE CURRENT TRANSFORMER HAVING RIGID SECONDARY EYE
BOLT AND FLEXIBLE PRIMARY CABLES IN HIGH VOLTAGE TANK
Filed June 14, 1965
Sheet 1 of 4
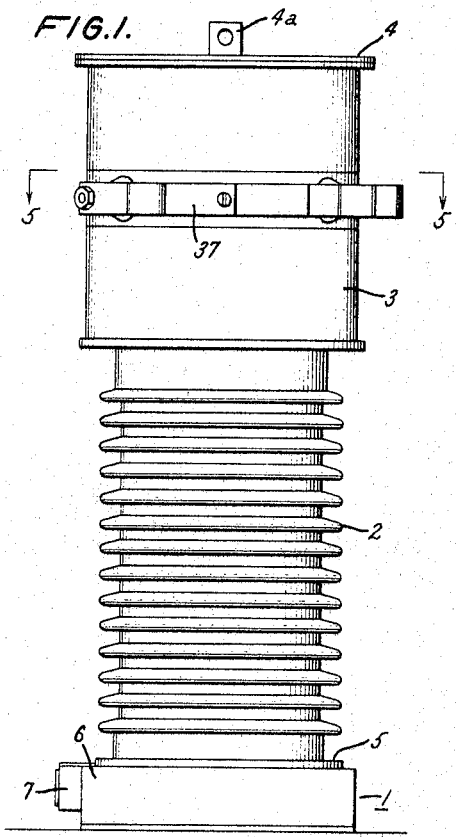
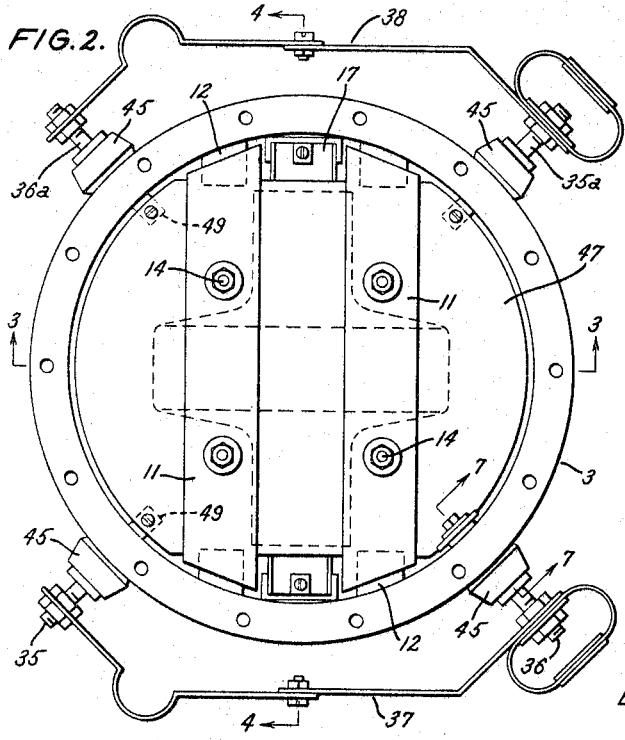
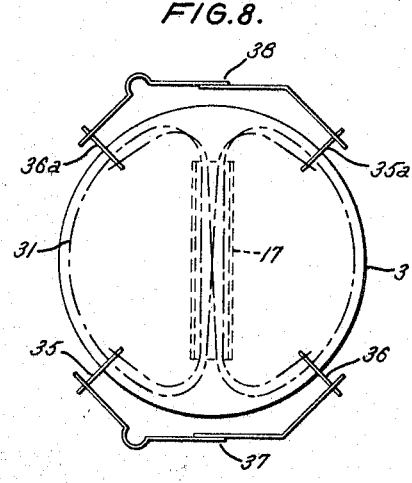
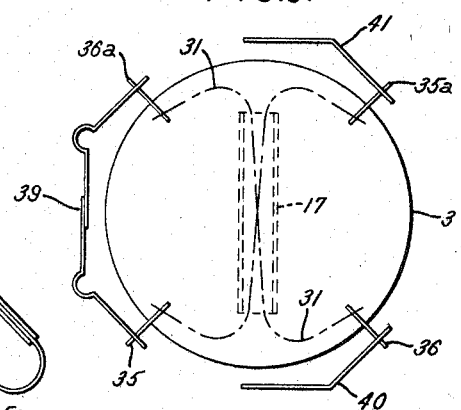
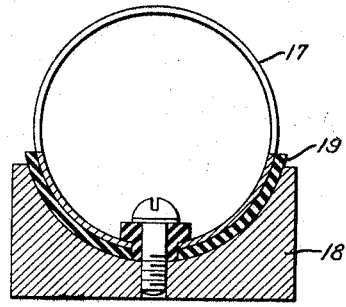
INVENTOR:
LOUIS W. MARKS,
BY J. Wesley Haulsen
ATTORNEY

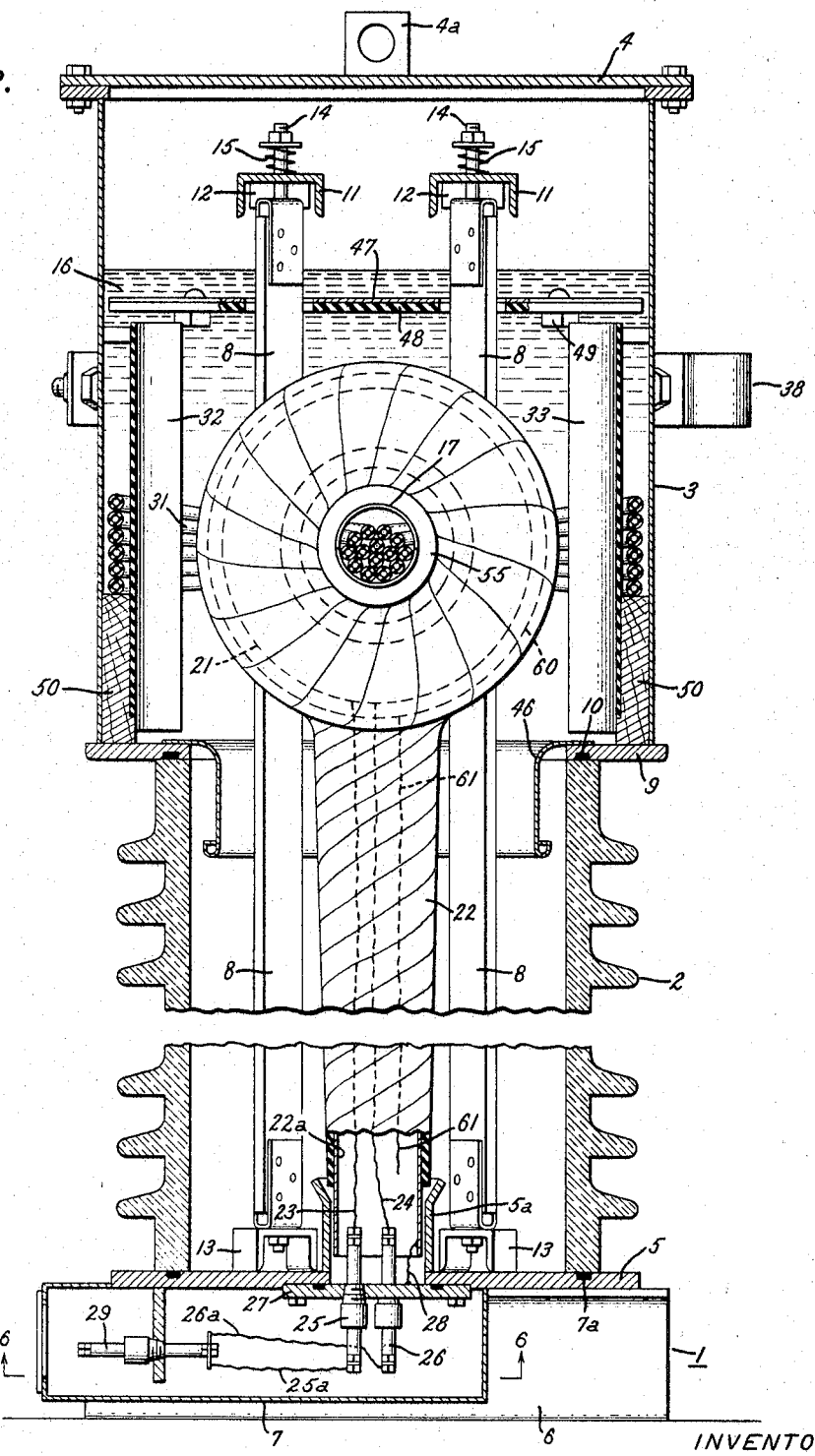

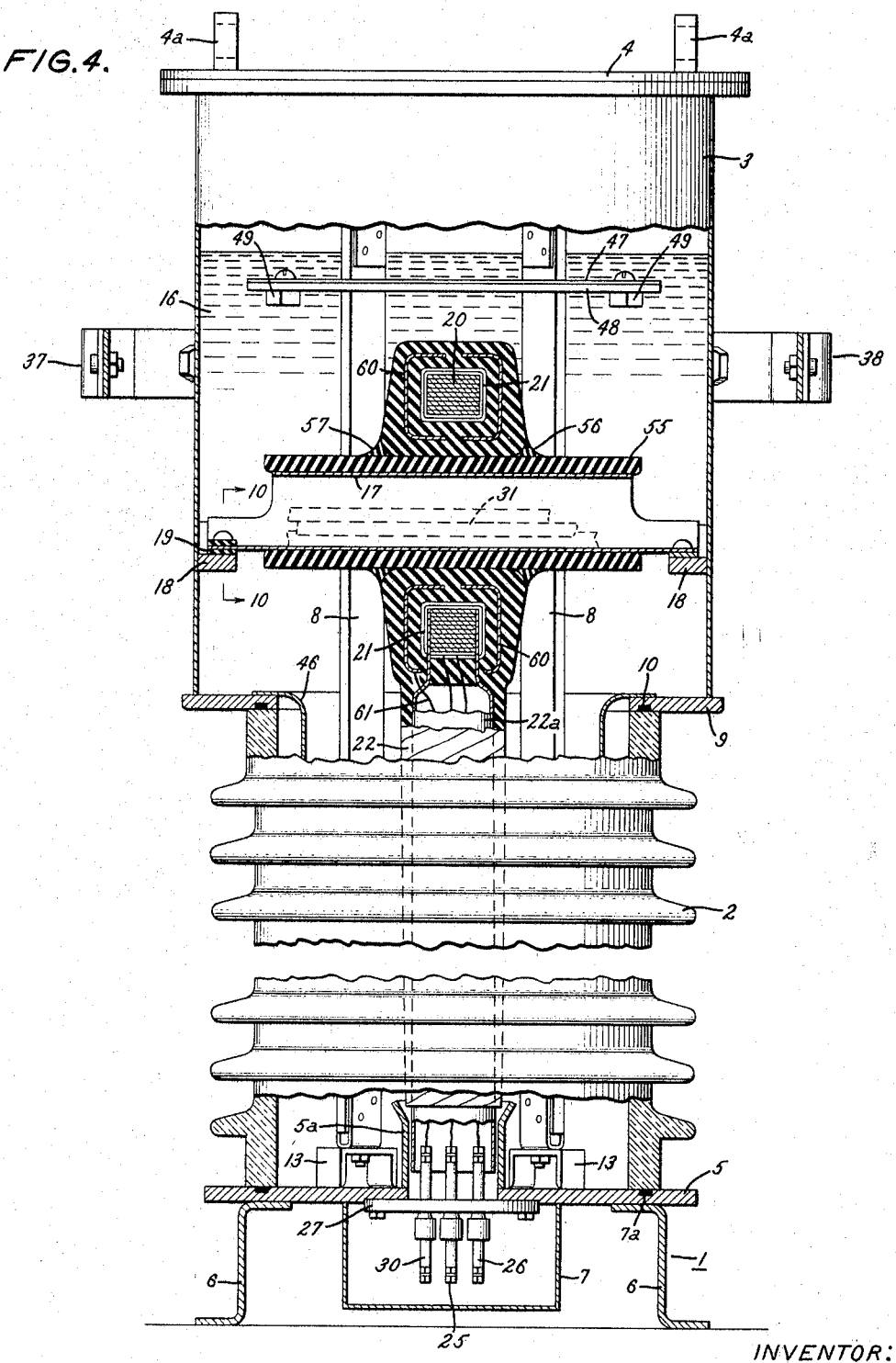

April 29, 1969　　　L. W. MARKS　　　3,441,885
HIGH VOLTAGE CURRENT TRANSFORMER HAVING RIGID SECONDARY EYE
BOLT AND FLEXIBLE PRIMARY CABLES IN HIGH VOLTAGE TANK
Filed June 14, 1965　　　Sheet 4 of 4

INVENTOR:
LOUIS W. MARKS,
BY J. Wesley Haubner
ATTORNEY

United States Patent Office 3,441,885
Patented Apr. 29, 1969

3,441,885
HIGH VOLTAGE CURRENT TRANSFORMER HAVING RIGID SECONDARY EYE BOLT AND FLEXIBLE PRIMARY CABLES IN HIGH VOLTAGE TANK
Louis W. Marks, Pittsfield, Mass., assignor to General Electric Company, a corporation of New York
Filed June 14, 1965, Ser. No. 463,750
Int. Cl. H01f 15/04
U.S. Cl. 336—84                15 Claims

ABSTRACT OF THE DISCLOSURE

The application discloses a high voltage current transformer of the liquid-immersed type in which a metal enclosing tank is mounted upon an insulating column and adapted for operation at high voltage. Entirely within the tank is wound a primary circuit formed of lightly insulated flexible cable traversing a horizontal conduit. A rigid heavily insulated secondary eye bolt is mounted on the conduit and its radial stem extends through the supporting insulator. The cable conduit is provided with a part of the primary to secondary insulation, and turn ratio is determined by variation in the number of primary turns. Means are provided to support the primary turns against magnetic forces and to connect such turns selectably in series or parallel circuit relation through exterior terminals on the tank.

---

Figure 5:
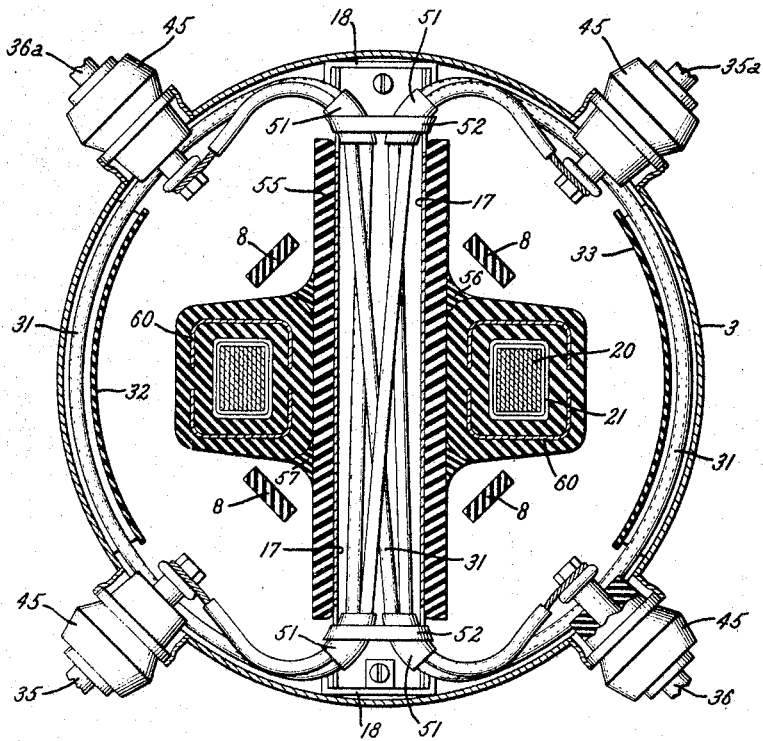

My invention relates to electric transformers, and more particularly to an improved high voltage current transformer of the fluid-immersed type. The invention is especially adapted for use in liquid insulated current transformers for high voltage application.

High voltage current transformers of the type wholly immersed in oil or other insulating dielectric liquid have commonly been built in a grounded metal tank with the high voltage primary winding formed as an integrally and heavily insulated "eye bolt" having a small number of annular turns with terminal leads extending in parallel spaced relation through a long radial arm or "stem" to high voltage terminals atop an insulating column. In such a transformer the low voltage secondary winding is toroidally wound upon an annular magnetic core which is interlinked with the primary "eye" and only lightly insulated. The primary eye bolt must be heavily insulated to protect it from the tank potential (i.e. ground potential) so that it is not necessary to provide heavy insulation on the secondary annulus.

Such transformers wherein a heavily insulated primary eye bolt is mounted within a grounded tank present several disadvantages, both in manufacture and in operation. In the design and manufacture of such transformers it is usual to provide a desired current ratio between primary and secondary by selecting an appropriate number and connection of primary turns for cooperation with a secondary winding of relatively fixed design. Since the design and construction of the primary eye bolt must precede assembly of the other parts of the transformer, and because construction of the primary eye bolt constitutes a major part of the total assembly work in building such a transformer, it is necessary to know the desired current ratio desired before any particular transformer is built. It is not feasible to maintain any useful warehouse stock of such transformers in view of the large variety of current ratios which may be needed. The large, heavily insulated primary eye bolt also presents constructional and maintenance difficulties in that due to presence of the interlinked secondary annulus, the primary annulus cannot readily be supported through its eye. Adequate support therefore tends to be difficult and expensive, and commonly results in inaccessibility for maintenance purposes.

The heavily insulated primary eye bolt also presents some problems in operation. First, because of its heavy insulation it does not readily dissipate heat generated by an overload in the primary conductors. For this reason such construction severely limits the continuous-overload current-carrying capacity, which can then only be increased by increasing conductor size. Moreover, the magnetically unbalanced disposition of a single primary ring and one or more interlinked secondary core rings causes the primary leakage flux to saturate each secondary core at a single peripheral location and thus to impair the accuracy of indication at relatively low over-current values.

Accordingly, therefore, it is a principal object of my invention to provide a new and improved high voltage, fluid-immersed current transformer in which a heavily insulated and relatively inaccessible primary winding of fixed design is avoided.

It is a further object of my invention to provide a high voltage, fluid-immersed current transformer which can be supplied in a variety of current ratios and primary circuit connections by quick and simple modification of a common major subassembly which can be prebuilt for warehouse stock.

Another object of my invention is to provide a high voltage fluid-immersed current transformer having a lightly insulated high voltage primary cable winding constructed and positioned to withstand high short circuit currents.

It is still another object of my invention to provide a high voltage fluid-immersed current transformer in which change of the primary connections between series and multiple turn relationship may be made without rewinding the primary winding.

It is still another object of my invention to provide an improved high voltage current transformer in which the saturating effect of primary leakage flux in the secondary winding core is reduced, thereby to improve accuracy over a wider range of currents.

It is a particular object of my invention to provide a high voltage liquid-immersed current transformer which is light in weight, easy to assemble and of low cost, while nonetheless reliable, accurate and rugged in operation.

In carrying out my invention in one preferred embodiment, I provide a metal housing or tank at high potential mounted upon a tubular high voltage insulating column with the tank and column substantially filled with insulating liquid. Extending substantially diametrically across the high potential housing and beneath the surface of the insulating liquid, I provide a tubular, metallic cable conduit. Lightly insulated primary cables are arranged in a selectable number of turns passing through the conduit and returning along the inner surface of the housing, the primary turns preferably being located in pairs on opposite sides of the conduit axis. The primary cable turns thus lie in two groups disposed in substantially coplanar relation on opposite sides of the conduit axis. The primary cable conduit also serves to support coaxially and substantially at its center a heavily insulated secondary winding eye bolt comprising an annular magnetic core surrounding the conduit and a radial arm, or stem, extending downwardly through the insulating column to low voltage secondary terminals in the grounded base of the assembly. The heavy insulation between the primary cable conduit and the secondary winding is preferably provided in large part upon the cable conduit itself, so that the amount of hand-applied tape insulation on the secondary eye bolt may be reduced. The primary cables are firmly held in place along opposite interior walls of the high voltage tank by concentric arcuate insulating barriers spaced inwardly from the walls, and are further strengthened by strong but absorbent binding and insulation at the point of their emergence from the primary cable conduit. In order to provide for selectable connection of the two oppositely disposed groups of primary cable turns either in series or parallel, each group of cable turns has its ends connected to a separate pair of external primary terminals.

Figure 6:
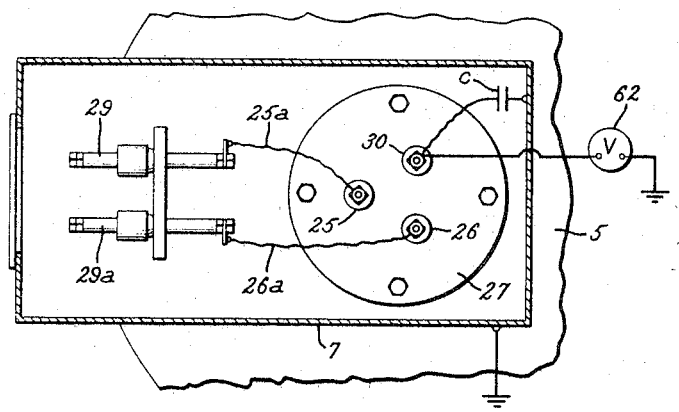
Figure 7:
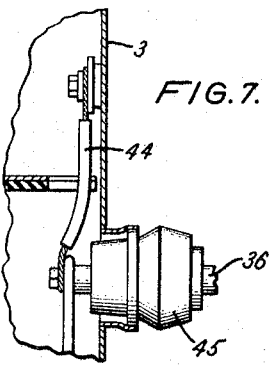

My invention will be more fully understood and its various objects and advantages further appreciated by referring now to the following detailed specification taken in conjunction with the accompanying drawing. In the drawing:

FIG. 1 is a side elevational view of a high voltage current transformer embodying my invention, FIG. 2 is a plan view of the transformer shown at FIG. 1 with the top cover removed, FIG. 3 is an axial cross-sectional view of the current transformer of FIG. 1 taken along the line 3—3 of FIG. 2, FIG. 4 is a side elevational view of the transformer of FIG. 1 partly in axial cross-section along the line 4—4 of FIG. 2, FIG. 5 is a transverse cross-sectional view taken along the line 5—5 of FIG. 1, FIG. 6 is a transverse cross-sectional view of the secondary terminal box taken along the line 6—6 of FIG. 3, there being shown schematically thereon circuit connections for voltage indication, FIG. 7 is a fragmentary axial cross-sectional view taken along the line 7—7 of FIG. 2, FIGS. 8 and 9 are schematic plan views showing in broken lines various primary circuit connections for the transformer of FIG. 1, and FIG. 10 is a fragmentary cross-sectional view taken along the line 10—10 of FIG. 4 to illustrate a mounting detail of the primary cable conduit.

Referring now to the drawings and more particularly to FIGS. 1–5 inclusive, I have shown a high voltage current transformer of a design particularly suitable for voltages in the range of 50–350 kilovolts. As shown generally at FIG. 1, the transformer comprises a metallic base portion 1 upon which is mounted in upright position a tubular high voltage insulating column 2. Upon the upper end of column 2 there is mounted a tubular, and preferably cylindrical, metallic housing or tank 3 disposed in coaxial relation with the insulating column to form therewith a single chamber closed at the top by means of a removable lid 4. The base 1 comprises a flat metal mounting plate 5 resting upon a pair of spaced-apart supporting beams 6 and a terminal housing 7 beneath the base plate 5. The lid 4 at the top of the housing 3 is provided with a pair of lifting lugs 4a, and the entire assembly is clamped together by a plurality of axially disposed tie bars 8 best illustrated at FIGS. 3, 4 and 5.

The base plate 5, column 2 and tank 3 are clamped together in fluid-tight relation. For this purpose the base plate 5 is provided with a circular groove in which is positioned a compressible gasket 7a. An annular ring 9 at the lower end of the tank 3 carries a similar gasket 10, and the gaskets 7a and 10 are positioned to engage opposite ends of the insulating column 2. In the upper portion of the tank or housing 3 a pair of transversely disposed bars or channel irons 11 are mounted upon pairs of oppositely disposed lugs 12 fixed to the interior wall of the tank. At axially opposite positions and on the base plate 5 are fixed a plurality of connecting lugs 13. The tie rods 8 are formed of insulating material and are connected between the base lugs 13 and the upper transverse bars 11 by means of suitable studs and bolts at the ends of the tie rods, the studs 14 at the upper ends of the tie rods being provided with compression springs 15 to maintain the assembly under constant predetermined axial compression. As shown at FIGS. 3 and 4, a body of suitable insulating liquid 16 fills the insulating column 2 and substantially fills the housing 3 to a level near the top of the housing.

The base portion 1 is adapted for operation at or near ground potential and provides a mounting base for the secondary winding terminals as will be more fully described hereinafter. The upper metallic housing 3 is adapted for operation at or near a predetermined high line voltage and is accordingly mounted upon the relatively tall insulating column 2. Within the housing 3 and beneath the surface of the insulating liquid 16, I provide primary and secondary current transformer windings. The primary winding is formed as a plurality of turns of flexible insulated cable traversing a common metallic cable conduit 17 and returning in pairs along opposite sides of the high voltage housing 3 as will be more fully described hereinafter. The tubular metallic cable conduit 17 extends diametrically across the high voltage housing 3 in a direction substantially perpendicular to the axis of the insulating column 2 and is mounted at opposite ends upon the walls of the housing 3. As best shown in FIGS. 4 and 5, the cable conduit 17 is mounted upon diametrically opposite lugs 18 fixed to the wall of the housing 3 and insulated therefrom at one end by an insulating spacer 19. The ends of the conduit 17 are cut away at their upper portions, as shown at FIG. 4 to provide openings through which primary cables may be emerged close to the walls of the housing 3.

The secondary winding is built into a secondary "eye bolt" which coaxially surrounds the cable conduit 17 substantially at its center and is supported by the conduit. The secondary eye bolt comprises an annular core 20 of magnetizable material having toroidally wound thereon a secondary winding 21 and a long radial arm or "stem" 22 through which the secondary winding leads are taken out to low voltage terminals. The stem 22 comprises a metallic tube 22a extending downwardly from the conduit 17 and substantially coaxially through the insulating column 2 to the region of the base plate 5. The radial metallic tube 22a in the secondary eye bolt is grounded at its lower end as shown at 28, FIG. 3, and is connected at its upper end to the core 20. To facilitate positioning of the base 1 in assembly of the transformer the base plate 5 is provided at its center with an upwardly extending flared collar 5a into which the stem tube 22 is adapted to telescope with a slip fit.

The annular core 20, secondary winding 21 and radial tube 22 are all integrally wrapped in a heavy covering of high voltage insulating material. The toroidal insulation on the core 20 and coil 21 is relatively heavy and is preferably blended into the insulation on tube 22. The tube insulation may be tapered, as shown, to a smaller thickness at the remote lower end of the tube 22. Preferably the insulation is formed of a saturable tape which, after thorough drying, is impregnated under vacuum by the insulating fluid. The eye bolt insulation is usually applied in a hand taping operation. As will be explained hereinafter it is not necessary with my improved construction to insulate even the annular upper portion of the eye bolt to withstand the full high line potential even though it surrounds the conduit 17, since the conduit 17 itself is also provided with insulation as will be more fully described hereinafter.

Low voltage secondary winding leads 23 and 24 (FIG. 3) extend from the winding 21 through the tube 22 to a pair of secondary terminals 25 and 26, respectively, mounted upon a plate 27 removably fixed to the base plate 5. As shown at FIG. 6 the terminals 25 and 26 are connected by leads 25a and 26a, respectively, to a pair of externally accessible secondary winding terminals 29 and 29a respectively. A third terminal 30 is provided in the terminal plate 27 for a purpose which will be more fully described hereinafter.

As best shown at FIGS. 3 and 5, the primary winding of my improved current transformer comprises a plurality of turns of flexible insulated cable generally designated by the reference numeral 31 and disposed in a substantially horizontal plane within the high potential housing 3 and beneath the surface of the insulating liquid 16. The primary turns are formed as one or more pairs of looped cable conductor passing through the transverse conduit 17 and returning around the inner periphery of the housing 3 along the side walls thereof. Each pair of such primary loops is disposed with one loop on each side of the conduit 17 thereby to provide two oppositely disposed groups of primary loops. The primary winding is thus in a balanced and symmetrical disposition with respect to the magnetizable core 20 and the toroidal secondary winding 21. All primary loops are preferably positioned in substantially horizontal planes perpendicular to the axial direction of the insulating column 2. On their outer sides the loops are positioned closely adjust opposite inner walls of the housing 3 and behind a pair of arcuate barrier plates 32 and 33 formed of rigid insulating material. The barrier plates 32 and 33 are mounted within the housing 3 in substantially parallel spaced relation with respect to the opposite side walls thereof. Since both the metal housing 3 and metal cable conduit 17 are maintained in operation at or near the high line potential of the primary winding, it is not necessary to provide more than relatively light cable insulation between the primary winding and these metal parts. It is of course necessary to provide some insulation on the primary cables so that they do not become short circuited with respect to each other.

The primary cable conductors 31 are passed through the cable conduit 17 in substantially parallel spacial relation, looped around the housing side walls behind the barriers 32 and 33 in the manner described above and connected together externally by means of two pairs of primary terminals 35, 35a and 36, 36a. As shown at FIGS. 2 and 5, the terminals 35, 35a, 36, 36a are arranged in quadrature around the periphery of the cylindrical housing 3 and may be connected together externally in a variety of combinations for the purpose of selecting the manner of connection of the primary loops with respect to each other. Internally each primary loop or group of primary loops is connected between one oppositely disposed pair of primary terminals. For example, referring to FIG. 5, the primary loop beginning at terminal 35 passes upwardly through the conduit 17, once around the left side of the tank as shown at FIG. 5, again upwardly through the conduit 17 and to the terminal 35a. A similar primary loop beginning at the terminal 36 passes around the right side of the tank (as shown at FIG. 5) and terminates at the primary terminal 36a. It will be evident that each of these loops could, if desired, be made to take several turns thereby to form a group of turns on each side of the conduit 17. The reason for the use of four primary terminals is illustrated at FIGS. 8 and 9. FIG. 8 shows the primary loops described above to be connected in parallel circuit relation by means of external conducting straps 37 and 38; FIG. 9 shows a similar pair of single primary turns (as contrasted with the double loops shown at FIGS. 5 and 8) with the single turns connected in series circuit relation by external conducting straps 39, 40 and 41.

The primary terminals 35, 35a, 36, 36a are each mounted upon the housing 3 in suitable insulating bushings 45 so that the primary turns are not short circuited by the housing. The housing 3, however, is maintained at the high line potential by connection of the housing to one of the line terminals. For this purpose I have shown at FIG. 7 a jumper 44 connected between the housing 3 and the line terminal 36. When a nonlinear resistor is connected across the primary the jumper 44 may be located on the outside of the tank.

Because of the high line potential of the housing 3, the cable conduit 17 and the horizontally positioned primary loop conductors 31, it is desirable to provide electrostatic shielding at several locations to modify the electrostatic field distribution and prevent concentrations of electrostatic stress which would otherwise occur. For this purpose I provide interiorly of the insulating column 2 and concentric therewith a cylindrical metallic shield 46 depending from the bottom of the housing 3 and extending into the insulating column. This shield is best shown at FIGS. 3, 4. In addition, electrostatic stress in the gas space above the surface of the insulating liquid 16 is minimized by a disk-shaped metallic shield 47 mounted upon a flat plate 48 of insulating material and fixed in the housing 3 in a horizontal position slightly below the surface of the liquid 16 (FIGS. 2, 3, 4). The shield 47 and the plate 48 are bolted to lugs 49 fixed to the wall of the housing 3 below the liquid surface and the bolts serve as electrical connection between shield and housing.

Under short circuit conditions the primary conductor loops 31 are likely to be subjected to severe disruptive forces, and for this reason they must be held firmly in place in the housing 3 and the conduit 17. This is accomplished in part by positioning of the outer ends of the primary turns between the housing walls and the barrier plates 32 and 33 and in part by firm binding of the emerging ends of the primary conductors to the open ends of the primary conduit 17. As shown at FIG. 3, wooden blocks 50 are provided between the housing 3 and the barriers 32 and 33 to provide a base upon which the outside turns of the primary conductors may rest. In addition, the primary turns 31 are firmly taped together in groups and to the primary conduit 17 at their points of emergence from the ends of the conduit. As shown at FIG. 5, the righthanded and lefthanded groups of primary conductors emerging from opposite ends of the conduit 17 are bound together by taping 51 at their points of emergence. In addition, both groups of conductors are taped together and to the conduit 17 in a common binding 52 at each end of conduit 17.

In order to prevent damaging of the conductors upon the open ends of the conduit 17, the tape used at these points must be of a high strength type. For this purpose I prefer to use a plastic impregnated glass tape. Such tape however, being impermeable to oil or other insulating liquids, tends to form voids within the wrapping and thus to preclude the entrance of insulating liquid and create areas of high electrostatic stress. In order to ensure that oil fully impregnates the binding tape, I prefer to provide alternate layers of liquid impermeable high strength tape and alternate layers of permeable insulation such as crepe paper or the like. With this taping structure the crepe paper acts as a wicking to ensure that oil fully impregnates the taped joint.

Referring now to the secondary eye bolt 22, it is evident that little insulation is needed between the primary turns 31, the high voltage housing 3 and conduit 17, but that heavy insulation is required between the conduit 17, the low voltage secondary winding 21 and the grounded magnetizable core 20. Referring to FIGS. 4 and 5, it will be observed that I provide this heavy insulation partially on the primary conduit 17 and partially on the annular portion of the secondary eye bolt 22. Thus the tube 17 is provided externally with a cylindrical layer of insulation 55 which may, for example, be formed by a substantially full length wrapping of insulating tape or sheet readily applied in a machine operation. With the conduit 17 heavily insulated, the amount of insulation on the secondary eye bolt itself may be somewhat reduced. The secondary eye bolt is therefore wrapped with insulating tape in the usual manner as described hereinbefore, but this expensive manual operation is reduced in cost to the degree that about ½ to ¾ of the total insulation between the primary and secondary windings may be provided on the cylindrical conduit 17. In order to minimize electrostatic stress at the juncture between the insulated conduit 17 and the annular portion of the secondary eye bolt, rings 56 and 57 of liquid permeable insulation having a cuspidal cross section are provided around the conduit 17 at opposite sides of the secondary annulus (FIG. 4).

The current transformer described above may, if desired, be further provided with means for indicating the voltage of the primary circuit. For this purpose I have illustrated at FIG. 3 a conductive electrostatic shield 60 of split toroidal form built into the annular insulation portion of the secondary eye bolt 22 and surrounding the toroidal secondary winding 21 and the grounded core 20. The shield 60 is connected by a lead 61 to the third terminal 30 on the base plate 27. As shown schematically on FIG. 6, the terminal 30 is connected to the grounded base portion 1 through a capacitor $c$ across which may be connected a voltmeter 62 or other potential indicating device. The capacitor $c$ is in parallel with the inherent distributed shield to ground capacitance and in series with the inherent distributed shield to line capacitance. By adjustment or selection of the value of $c$ a desired percentage of line-to-ground voltage may be made to appear across the voltage indicating device. If the voltage indication described is not desired, the shield 60 may desirably be connected directly to ground to aid in distribution of electrostatic field stress.

It will now be evident that I have provided a current transformer wherein, because of high potential operation of the enclosing tank and inclusion of the secondary winding in a heavily insulated eye bolt structure, the primary winding may be formed of flexible and lightly insulated cables laid into the housing as a final step in the construction of the apparatus. With this construction it is possible to build up in advance a subassembly of predetermined structure determined only by voltage rating and to complete the structure in a quick and simple operation when it is known how many primary turns are needed to provide a desired current ratio. In addition, the primary turns, being wound between two rectilinearly disposed pairs of diametrically opposite primary terminals, may be selectably connected in either parallel or series circuit relation without access to the interior of the transformer tank. It is thus possible readily to provide a variety of current ratios while utilizing prestocked transformer subassemblies wherein the major portion of the constructional work is completed before final design of the primary winding.

What I claim as new and desire to secure by Letters Patent of the United States is:

1. A high voltage electric current transformer assembly comprising:
   (a) a metal base adapted to be electrically connected to ground potential,
   (b) a tubular column of insulating material seated at one end upon said base and having its axis substantially vertical, said base closing said one end of said column,
   (c) a metallic housing having an open bottom end seated upon the top of said column and forming therewith a single closed chamber, said chamber being substantially filled with an insulating dielectric liquid and said housing being adapted to be electrically connected to a predetermined high line potential,
   (d) a tubular metal conduit entirely within said housing and extending horizontally across said housing beneath the surface of said liquid and transversely of the axis of said insulating column, said conduit having open ends supported upon opposite internal wall portions of said housing and at least one end of said conduit being insulated from said housing,
   (e) a heavily insulated secondary eye bolt having an annular magnetic core mounted coaxially and substantially centrally upon said conduit, and a radial stem extending coaxially downward through said tubular column, said magnetic core carrying a toroidal secondary winding having leads extending downwardly through said stem, and
   (f) a lightly insulated primary conductor cable disposed to form at least one pair of loops traversing said conduit in parallel spacial relation and returning externally thereof on opposite sides of the conduit axis and entirely within said housing.

2. A current transformer according to claim 1 in which said primary conductor loops are in substantially coplanar relation on opposite sides of said conduit and in a plane substantially perpendicular to the axis of said column.

3. A current transformer according to claim 1 and including in addition a metallic shielding plate adjacent and parallel to the liquid surface extending into close proximity with the walls of said housing around its entire periphery.

4. A current transformer assembly according to claim 1 and including in addition two pairs of primary winding terminals insulatingly mounted in substantially quadrature relation about the periphery of said housing, and means connecting the ends of each said cable loop to separate pairs of said primary terminals thereby to provide selectably for series or multiple connection of said primary conductor loops through terminal connections outside said housing.

5. A high voltage electric current transformer assembly comprising:
   (a) a metal base adapted to be electrically connected to ground potential,
   (b) a tubular column of insulating material seated at one end upon said base and having its axis substantially vertical, said base closing said one end of said housing,
   (c) a tubular metal housing coaxially mounted upon the top of said column and adapted to be electrically connected to a predetermined high line potential, said column and housing being substantially filled with an insulating dielectric liquid having a surface adjacent the top of said housing,
   (d) a tubular metal cable conduit extending transversely across said housing beneath said liquid surface and substantially perpendicular to the axis of said insulating column, said conduit having open ends mounted upon opposite wall portions of said housing and at least one said end being insulated from said housing,
   (e) a secondary winding eye bolt having an annular end coaxially mounted upon said conduit and a radial stem extending coaxially through said insulating column,
   (f) a pair of barrier plates of insulating material oppositely disposed in said housing along the sides of said conduit and spaced from the walls of said housing, and
   (g) at least a single pair of primary cable loops traversing said conduit in parallel spacial relation and returning externally of said conduit on opposite sides thereof in the spaces between the wall of said tubular housing and said oppositely disposed arcuate barrier plates.

6. A current transformer according to claim 5 wherein said housing is cylindrical and said barrier plates are arcuate and disposed in parallel spaced relation with the housing walls at opposite sides of said cable conduit.

7. A current transformer according to claim 5 wherein a plurality of pairs of primary cable loops is provided with the loops of each pair disposed on opposite sides of said conduit, and including in addition a multilayer binding of insulating tape tying together said primary cable loops at their points of emergence from said cable conduit, said insulating binding comprising alternate layers of high strength plastic impregnated tape and liquid impregnable paper insulation, said paper insulation by capillary action substantially eliminating voids in said insulating binding.

8. A high voltage electric current transformer assembly comprising:
(a) a metal base adapted to be electrically connected to ground potential,
(b) a tubular column of insulating material seated at one end upon said base and having its axis substantially vertical, said base closing said one end of said column,
(c) a metal housing having an open bottom end seated upon the top of said column and forming therewith a single closed chamber, said chamber being substantially filled with an insulating dielectric liquid, and said housing being adapted to be electrically connected to a predetermined high line potential,
(d) a tubular metal conduit extending transversely across the interior of said housing beneath the surface of said liquid and having open ends adjacent opposite wall portions of said housing,
(e) a substantially cylindrical covering of solid insulating material on the outer surface of said tubular conduit,
(f) a secondary eye bolt having an annular magnetic core mounted coaxially and substantially centrally upon said conduit and a toroidal winding surrounding said core, said core and secondary winding being integrally wrapped with insulating tape to an extent sufficient to provide with the solid insulation on said conduit adequate insulation between said line potential and ground, said eye bolt including a radial stem extending downwardly through said tubular column, and
(g) a plurality of flexible insulated primary cable loops traversing said conduit within said housing.

9. A current transformer according to claim 8 in which the cylindrical covering of solid insulation on said conduit has a thickness of the order of 50% to 75% of the total thickness of insulation between said conduit and the core of said secondary winding.

10. A high voltage electric current transformer assembly comprising:
(a) a metal base adapted to be electrically connected to ground potential,
(b) a tubular column of insulating material seated at one end upon said base and having its axis substantially vertical, said base closing said one end of said column,
(c) a tubular metal housing closed at the top and coaxially mounted upon the upper end of said column, said column and housing being substantially filled with an insulating dielectric liquid having a surface adjacent the top of said housing, and said housing being adapted to be electrically connected to a predetermined high line potential,
(d) a tubular metal cable conduit extending transversely across the interior of said housing beneath the surface of said liquid and mounted upon opposite wall portions of said housing, said conduit having open ends spaced from said opposite wall portions and being electrically connected to said housing at one end only,
(e) a substantially cylindrical layer of solid insulating material on the outer surface of said conduit,
(f) a plurality of flexible insulated primary cable loops traversing said conduit in parallel spacial relation and disposed externally thereof on opposite sides of said conduit in symmetrical coplanar groups adjacent opposite inner walls of said housing,
(g) a pair of arcuate insulating barriers in spaced relation with the walls of said housing at opposite sides of said conduit, said groups of cable loops passing respectively between said barriers and said housing walls, and
(h) alternate layers of liquid impermeable high strength insulating tape and liquid permeable insulating tape binding said cable loops together adjacent the open ends of said conduit.

11. A high voltage electric current transformer assembly comprising:
(a) a metallic housing mounted upon an insulating column and containing a body of insulating dielectric liquid, said housing being adapted to be electrically connected to a predetermined high line potential,
(b) a tubular metallic conduit extending interiorly across said housing beneath the surface of said liquid and electrically connected to operate substantially at said high line potential,
(c) a plurality of primary winding loops of flexible insulating cable traversing said conduit in parallel spacial relation and emerging from opposite ends thereof,
(d) oil-permeable insulating tape binding said cable loops to said conduit adjacent the open ends of said conduit, and
(e) an insulated secondary eye bolt having an annular core portion coaxially mounted upon said tubular conduit.

12. A high voltage electric current transformer comprising:
(a) a metal base including a flat mounting plate, said mounting plate being provided centrally with an upright positioning collar,
(b) a tubular insulating column mounted on one end upon said plate with a compressible gasket disposed therebetween, the axis of said insulating column extending vertically upward above said mounting plate,
(c) a tubular metal housing closed at the top and mounted upon the upper end of said insulating column with a second compressible gasket therebetween,
(d) a tubular metal cable conduit mounted transversely of said column and entirely within said housing, said conduit having open ends adjacent opposite internal wall portions of the housing,
(e) at least one pair of loops of flexible insulated cable traversing said conduit in parallel spacial relation and returning in substantially coplanar relation along opposite sides of said housing,
(f) a secondary eye bolt having an annular magnetic core portion mounted concentrically and centrally upon said cable conduit, said eye bolt including an elongate radial stem extending downwardly through said insulating column to the region of said mounting plate, said radial stem comprising an insulated metal tube having a lower end portion in sliding telescoping relation with said positioning collar,
(g) a plurality of tie rods connected between said mounting plate and said housing to hold said base, said housing and said insulating column together in clamping relation, and
(h) a body of insulating dielectric liquid in said housing immersing said eye bolt and cable loops.

13. A high voltage current transformer according to claim 12 wherein there is provided within said metal housing and beneath the surface of said insulating liquid a horizontal metal shielding plate connected electrically to said housing.

14. A high voltage electric current transformer comprising:
(a) a metal enclosure adapted to be electrically connected for operation to a predetermined high line potential,
(b) an open-ended metallic cable conduit horizontally disposed transversely across the interior of said enclosure and electrically connected thereto,
(c) at least one pair of primary conductor loops traversing said conduit in parallel spacial relation and returning externally thereof symmetrically on opposite sides of the conduit axis and with said enclosure, said primary conductor loops on each side of said conduit constituting a primary conductor group of at least one turn each, (d) two pairs of primary winding terminals insulatingly mounted upon said enclosure for access from the exterior thereof, (e) means connecting the ends of each said primary conductor groups to separate pairs of said primary winding terminals thereby to provide selectably for series or multiple connection of said conductor groups, and (f) an annular magnetizable core having a low voltage secondary winding thereon and mounted concentrically upon said conduit.

15. A current transformer according to claim 14 wherein said conduit is coated externally with a layer of insulating material and said secondary core and winding forms the annular part of an insulated secondary eye bolt having a radial stem through which low voltage secondary leads are led from said enclosure.

References Cited

UNITED STATES PATENTS

| | | | |
|---|---|---|---|
| 1,301,636 | 4/1919 | Arnold | 336—65 |
| 2,297,605 | 9/1942 | Camilli | 336—94 |
| 2,331,106 | 10/1943 | Camilli | 336—173 X |
| 2,701,335 | 2/1955 | Sargeant et al. | 336—174 X |
| 2,849,694 | 8/1958 | Prince | 336—174 |
| 2,947,958 | 8/1960 | Marks | 336—84 |

FOREIGN PATENTS 972,303  1/1951  France.

RUDOLPH V. ROLINEC, *Primary Examiner.*

A. E. SMITH, *Assistant Examiner.*

U.S. Cl. X.R.

324—127; 336—94, 147, 173